United States Patent
Kissel et al.

(10) Patent No.: US 11,802,994 B2
(45) Date of Patent: Oct. 31, 2023

(54) EASY-CLEAN COATING

(71) Applicant: HOYA Optical Labs of America, Inc., Lewisville, TX (US)

(72) Inventors: David J. Kissel, Andover, MN (US); Patrick S. Hawk, Columbia Heights, MN (US); Michael S. Boulineau, Forest Lake, MN (US)

(73) Assignee: HOYA Optical Labs of America, Inc., Lewisville, TX (US)

( * ) Notice: Subject to any disclaimer, the term of this patent is extended or adjusted under 35 U.S.C. 154(b) by 604 days.

(21) Appl. No.: 16/801,063

(22) Filed: Feb. 25, 2020

(65) Prior Publication Data

US 2020/0192000 A1   Jun. 18, 2020

Related U.S. Application Data

(63) Continuation of application No. 14/621,334, filed on Feb. 12, 2015, now Pat. No. 10,613,255.

(60) Provisional application No. 61/945,676, filed on Feb. 27, 2014, provisional application No. 61/939,147, filed on Feb. 12, 2014.

(51) Int. Cl.
| | |
|---|---|
| G02B 1/11 | (2015.01) |
| G02B 27/00 | (2006.01) |
| C09D 5/16 | (2006.01) |
| C09D 5/00 | (2006.01) |
| G02B 1/18 | (2015.01) |
| C09D 183/12 | (2006.01) |

(52) U.S. Cl.
CPC .............. *G02B 1/11* (2013.01); *C09D 5/006* (2013.01); *C09D 5/1675* (2013.01); *G02B 1/18* (2015.01); *G02B 27/0006* (2013.01); *C09D 183/12* (2013.01); *G02B 2207/107* (2013.01); *G02B 2207/109* (2013.01)

(58) Field of Classification Search
CPC .... C09D 5/1675; C09D 5/006; C09D 183/12; G02B 1/11; G02B 27/0006; G02B 1/18; G02B 2207/109; G02B 2207/107
See application file for complete search history.

(56) References Cited

U.S. PATENT DOCUMENTS

| | | |
|---|---|---|
| 2,832,754 A | 4/1958 | Jex |
| 2,920,095 A | 1/1960 | Jex |
| 3,166,527 A | 1/1965 | Ender |
| 3,837,876 A | 9/1974 | Mayuzumi et al. |
| 3,961,977 A | 6/1976 | Koda et al. |
| 3,986,997 A | 10/1976 | Clark |
| 4,006,271 A | 2/1977 | French et al. |
| 4,027,073 A | 5/1977 | Clark |
| 4,042,769 A | 8/1977 | Lynch |
| 4,081,421 A | 3/1978 | Yoshida et al. |
| 4,191,804 A | 3/1980 | Weber |
| 4,196,014 A | 4/1980 | Taniyama et al. |
| 4,241,116 A | 12/1980 | Taniyama et al. |
| 4,291,097 A | 9/1981 | Kamada et al. |
| 4,348,462 A | 9/1982 | Chung |
| 4,378,250 A | 3/1983 | Treadway et al. |
| 4,378,389 A | 3/1983 | Maruyama et al. |
| 4,387,195 A | 6/1983 | Tully et al. |
| 4,405,679 A | 9/1983 | Fujioka et al. |
| 4,422,721 A | 12/1983 | Hahn et al. |
| 4,472,464 A | 9/1984 | Haluska et al. |
| 4,619,949 A | 10/1986 | Sell et al. |
| 4,678,688 A | 7/1987 | Itoh et al. |
| 4,691,038 A | 9/1987 | Pohl et al. |
| 4,737,476 A | 4/1988 | Hillig |
| 4,775,415 A | 10/1988 | Mohr et al. |
| 4,800,122 A | 1/1989 | Sallavanti et al. |
| 4,876,305 A | 10/1989 | Mazany |
| 4,911,864 A | 3/1990 | Sato et al. |
| 5,008,422 A | 4/1991 | Blum et al. |
| 5,015,523 A | 5/1991 | Kawashima et al. |
| 5,030,745 A | 7/1991 | Weber et al. |
| 5,101,055 A | 3/1992 | Dinh et al. |
| 5,127,362 A | 7/1992 | Iwatsu et al. |
| 5,219,654 A | 6/1993 | Singh et al. |
| 5,316,791 A | 5/1994 | Farber et al. |
| 5,395,697 A | 3/1995 | Morrison |
| 5,619,288 A | 4/1997 | White, Jr. et al. |
| 5,639,555 A | 6/1997 | Bishop |
| 5,719,705 A | 2/1998 | Machol |
| 5,728,758 A | 3/1998 | Smith |
| 5,786,032 A | 7/1998 | Hughes |
| 5,798,182 A | 8/1998 | LeFebvre et al. |
| 5,800,926 A | 9/1998 | Nogami et al. |
| 5,853,800 A | 12/1998 | Dombrowski et al. |
| 5,895,609 A | 4/1999 | Doyle et al. |
| 5,902,847 A | 5/1999 | Yanagi et al. |

(Continued)

FOREIGN PATENT DOCUMENTS

| | | |
|---|---|---|
| CL | 199200978 | 9/1992 |
| CL | 199702707 | 12/1997 |

(Continued)

OTHER PUBLICATIONS

Machine English translation of JP 4606557, Tatsumisago et al., Jan. 5, 2011.*
WIPO, U.S. International Search Authority, International Search Report and Written Opinion dated May 14, 2015 in International Patent Application No. PCT/US2015/015717, 9 pages.
Scratch Resistant Coatings, "Ultra Optics Thermal Cure Coating System," Brooklyn Center, Minnesota, May 30, 2003, 6 pages.
Korea Patent Office, Office Action dated Jun. 8, 2020 with English translation in Korean Patent Application No. 10-2016-7023978, 11 pages.
China Patent Office, Office Action dated May 24, 2017 with English translation in Chinese Patent Application No. 201580018990.4, 15 pages.

(Continued)

*Primary Examiner* — Patrick D Niland
(74) *Attorney, Agent, or Firm* — Inskeep IP Group, Inc.

(57) ABSTRACT

An easy-cleaning coating, an easy cleaning coating having anti-fogging properties, and an easy-cleaning, anti-reflective coating.

32 Claims, 5 Drawing Sheets

(56) References Cited

U.S. PATENT DOCUMENTS

| | | |
|---|---|---|
| 5,997,943 A | 12/1999 | Azzopardi et al. |
| 6,001,163 A | 12/1999 | Havey et al. |
| 6,056,900 A | 5/2000 | Shimizu |
| 6,057,040 A | 5/2000 | Hage |
| 6,072,008 A | 6/2000 | Matsuno et al. |
| 6,124,026 A | 9/2000 | McCurdy et al. |
| 6,129,042 A | 10/2000 | Smith et al. |
| 6,200,684 B1 | 3/2001 | Yamaguchi et al. |
| 6,250,760 B1 | 6/2001 | Treadway |
| 6,265,029 B1 | 7/2001 | Lewis |
| 6,284,360 B1 | 9/2001 | Johnson et al. |
| 6,350,929 B2 | 2/2002 | Magne-Drisch et al. |
| 6,355,104 B1 | 3/2002 | Polster |
| 6,372,354 B1 | 4/2002 | Park et al. |
| 6,416,817 B1 | 7/2002 | Rangwalla et al. |
| 6,420,451 B1 | 7/2002 | Lin et al. |
| 6,514,574 B1 | 2/2003 | Valeri et al. |
| 6,585,373 B2 | 7/2003 | Evans et al. |
| 6,613,433 B2 | 9/2003 | Yamamoto et al. |
| 6,770,324 B2 | 8/2004 | Hooker |
| 7,018,463 B2 | 3/2006 | Terry |
| 7,025,458 B2 | 4/2006 | Vu |
| 7,217,440 B2 | 5/2007 | Jallouli et al. |
| 2002/0041929 A1 | 4/2002 | Magne |
| 2002/0159160 A1 | 10/2002 | Kayanoki |
| 2003/0198705 A1 | 10/2003 | Foreman et al. |
| 2004/0156983 A1 | 8/2004 | Moravec et al. |
| 2004/0253369 A1 | 12/2004 | Jallouli et al. |
| 2006/0019114 A1 | 1/2006 | Thies et al. |
| 2007/0009747 A1 | 1/2007 | Medwick et al. |
| 2007/0104922 A1 | 5/2007 | Zhai et al. |
| 2008/0268229 A1 | 10/2008 | Lee et al. |
| 2009/0120874 A1 | 5/2009 | Jensen et al. |
| 2011/0008630 A1 | 1/2011 | Okazaki et al. |
| 2012/0009429 A1 | 1/2012 | Shmueli et al. |
| 2012/0019767 A1 | 1/2012 | Cadet et al. |
| 2012/0019915 A1 | 1/2012 | Yan et al. |
| 2013/0216807 A1 | 8/2013 | Wakefield et al. |
| 2016/0266281 A1 | 9/2016 | Marshall et al. |

FOREIGN PATENT DOCUMENTS

| | | |
|---|---|---|
| CL | 199801589 | 7/1998 |
| CL | 199900032 | 1/1999 |
| CL | 199900860 | 4/1999 |
| CL | 200001460 | 6/2000 |
| CL | 200003249 | 11/2000 |
| CL | 201701856 | 7/2017 |
| CN | 102317228 A | 1/2012 |
| EP | 0072473 A2 | 2/1983 |
| EP | 0145201 A1 | 6/1985 |
| EP | 0561016 A1 | 9/1993 |
| EP | 0842711 A1 | 5/1998 |
| EP | 1022587 A | 7/2000 |
| EP | 1273639 A | 1/2003 |
| JP | 51-042770 A | 4/1976 |
| JP | 54-067000 A | 5/1979 |
| JP | 59-015457 A | 1/1984 |
| JP | 61-026638 A | 2/1986 |
| JP | 61-044932 A | 3/1986 |
| JP | 52-015905 A2 | 8/1993 |
| JP | 2002-122704 A | 4/2002 |
| JP | 2010-500277 A | 1/2010 |
| JP | 4606557 * | 1/2011 |
| JP | 2012-237941 A | 12/2012 |
| WO | WO2001/088048 A | 11/2001 |
| WO | WO2004/011158 A1 | 2/2004 |
| WO | WO2004/056495 A1 | 7/2004 |

OTHER PUBLICATIONS

China Patent Office, Office Action dated Mar. 1, 2019 with English translation in Chinese Patent Application No. 201580018990.4, 11 pages.

Peru Patent Office, Office Action dated Apr. 23, 2020 with English translation in Peruvian Patent Application No. 001472-2016, 12 pages.

Chile Patent Office, Office Action dated May 25, 2018 with English translation in Chile Patent Application No. 2052-2016, 21 pages.

* cited by examiner

| Component Name | Percent by weight solution |
|---|---|
| Methanol | 33.58 |
| Ethanol | 30.67 |
| Water | 24.22 |
| Propylene glycol monomethyl ether | 10.67 |
| Coating Solids | 0.86 |
| Total components | 100 |

|  | Reflectance | | | | Transmittance |
|---|---|---|---|---|---|
|  | L* | a* | b* | Y | Y |
| Lens with Pre-Tuned Anti-Reflective Stack | 13.5 | -14.6 | 7.5 | 1.6 | 97.6 |
| Same Lens Tuned Anti-Reflective Stack (After Coating with Easy-Cleaning Coating) | 45.7 | 5.3 | -10.5 | 15.0 | |

|  | Sample A | Sample B | Sample C |
|---|---|---|---|
| Initial | 0.04 | 0.08 | 0.197 |
| Sebum | 26.13 | 27.44 | 34.47 |
| 5 strokes | 15.98 | 16.25 | 6.192 |
| 10 strokes | 12.72 | 13.91 | 2.767 |
| 15 strokes | 7.71 | 14.63 | 1.26 |

EASY-CLEAN COATING

RELATED APPLICATIONS

This application is a continuation of U.S. patent application Ser. No. 14/621,334, filed Feb. 12, 2015, entitled Easy-Clean Coating, which claims benefit of and priority to U.S. Provisional Application Ser. No. 61/939,147 filed Feb. 12, 2014, entitled Cleanable Coating With Anti-Fogging Properties and to U.S. Provisional Application Ser. No. 61/945,676 filed Feb. 27, 2014, entitled Easy-Clean Antireflective Coating, all of which are hereby incorporated herein by reference in their entireties.

FIELD OF THE INVENTION

The present invention is directed to optical coatings and, more particularly, to optical coatings that are easy to clean and that are anti-fogging and/or anti-reflective.

BACKGROUND OF THE INVENTION

A functional coating or one or more functional coatings can be applied to a surface of article in order to impart one or more properties or characteristics to the surface of the article. Such properties or characteristics imparted may include color, gloss, reflectivity, abrasion resistance, optical clarity, water repellency, resistance to fogging, anti-reflectivity, resistance to soiling, and ease of cleaning. Of these various properties, the surface property or characteristic of ease of cleaning or easy-cleaning has potentially broad applications across a variety of industries including optical and non-optical related industries.

Current technologies employed to produce easily cleanable coatings or properties on surfaces often involve the application of a coating or surface treatment that is both hydrophobic and oleophobic. It has conventionally been considered desirable that a functional coating repel both oils and water, hence, these characteristics have been held as the benchmark for cleanability in the marketplace. Unfortunately, basic market surveys reveal that current easy-cleaning coating technologies do not perform at the levels expected by the market or the level indicated by marketing literature.

Current easy-cleaning coating technologies are chiefly directed towards achieving the highest possible wetting angle for both water and oils because correlations have been made between high wetting angle for water and oil and surface resistance to smudges, fingerprints, and ease of cleaning. The basis of this target wetting performance lends to the objective that current easy-cleaning coating surface energy be rendered as low as possible, e.g. below that of Teflon-like materials or below approximately 17-21 millijoules per square meter. In general, coatings of these types do not perform well with respect to cleaning because complete non-wetting of oily substances has not been achieved in a durable and manufacturable coating system. Instead, the inherent partial wetting of oily substances on current coatings actually enhances the smeared appearance created when a thin layer of oils or dirt is left behind and is present as small droplets after cleaning is attempted. The presence of tiny droplets creates a hazy appearance by way of light scattering.

In optical-based industries, it is often desirable to combine the properties or characteristics of ease of cleaning with other functional properties or characteristics, for example, anti-fogging. However, the inherent hydrophobicity of current easy-cleaning coatings renders them not feasible for fogging resistance since water droplets are capable of adhering to them in a partially non-wetted state, creating the appearance of fogging by way of light scattering.

Current anti-fogging coatings utilize a different technology when compared to typical cleanable coating systems. Since the mechanism of fogging involves the formation of small water droplets that scatter visible light, coating systems that force the water to completely wet the surface eliminate this effect. The majority of anti-fogging technologies rely on the deposition of a surfactant on the surface of the article, which results in a short-lived resistance to fogging since the layer is quite temporary under conditions of use. Most often, the act of cleaning the surface is sufficient to remove the anti-fogging property.

Other technologies employ the use of a hydrophilic coating layer, usually composed of a material that has a permanent hydrophilicity. However, these types of coatings are typically not durable and cannot be used in applications where abrasion is present. In addition, commercially available hydrophilic anti-fogging coatings do not necessarily lend themselves to being cleanable, based on their inherent surface energetic properties. Accordingly, current coatings are marketed as either easy to clean or having anti-fogging properties. This is a result of the non-existence of a coating system that combines both properties in a durable and manufacturable way.

In optical-based industries, it is often also desirable to combine the properties or characteristics of ease of cleaning with functional properties or characteristics such as the property of anti-reflectivity. For example, current easy-to-clean, anti-reflective coatings for use on, for example ophthalmic products, typically consist of a first substrate, e.g. an uncoated lens or other substrate material, an optional hard-coating system, and an anti-reflective coating system, which is imparted with a hydrophobic or superhydrophobic top or outermost layer intended to provide an easy-cleaning property. This top-functional coating typically comprises silica and perfluorosilyl chemical groups, which impart a dewetting behavior of water and oil-like substances. The dewetting of the oil-like substances from this surface having a low apparent surface energy is what is currently considered to be the easy-cleaning property marketed and/or tested using current ophthalmic industry standardized testing. Such easy-cleaning, anti-reflective systems or coatings fail to perform at the levels expected by the market or the level indicated by marketing literature.

Hence, there exists a need for coatings and coating systems that impart effective easy-cleaning properties to a surface of an article alone and in combination with other functional coatings or coating systems that impart desirable surface properties.

OBJECTS AND SUMMARY OF THE INVENTION

The present invention provides coatings and coating systems that impart effective easy-cleaning properties to a surface of an article alone and/or in combination with other functional coatings or coating systems that impart desirable surface properties. These and other objectives are achieved, in part, through providing an ophthalmic article comprising: a substrate having a first surface; a plurality of refractive layers, a first of the plurality of refractive layers deposited directly on said first surface and a last of the plurality of refractive layers forming a second surface; and a top layer having a surface energy in a range of approximately 30 to 90 millijoules per square meter deposited on the second surface; the ophthalmic article having a refractive index in the range of approximately 1.40 to 1.49 at a wavelength of 589 nanometers only after the top layer is deposited on the second surface.

These and other objectives are also achieved, in part, through a method from making an ophthalmic article having easy-clean and anti-reflective properties comprising: forming a plurality of refractive layers on a surface of an ophthalmic article; applying a silane-based layer having a cured surface energy in a range of approximately 30 to 90 millijoules per square meter on said plurality of refractive layers; and imparting the ophthalmic article with a refractive index in a range of approximately 1.40 to 1.49 at a wavelength of 589 nanometers through said step of applying a silane-based layer on said plurality of refractive layers.

These and other objectives are also achieved, in part, through providing a coating that imparts an easy-cleaning property on a surface comprising: a cured surface comprising pores having diameters in a range of approximately 2 to 100 nanometers and a surface energy in a range of approximately 30 to 90 millijoules per square meter.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DESCRIPTION OF EMBODIMENTS

Figure 1:
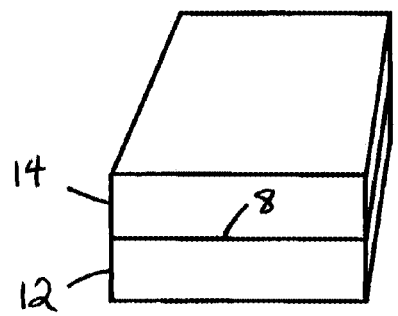
FIG. 1 is a perspective view of a coated substrate according to one embodiment of the present invention.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements. Particle sizes are given in diameter measure of the units mentioned.

Broadly speaking, the present invention provides coating and coating systems that impart a durable, easy-cleaning property to surfaces of articles, for example, the surfaces of air conditioning systems, clothing, and food processing equipment and to the surfaces of optical-based articles such as ophthalmic lenses, windows, lens coverings and protective shields. In certain embodiments of the present invention, the inventive easy-clean coating is combined with other functional treatments, coatings, and/or coating systems so as to impart additional properties and characteristics on to a surface such as color, gloss, reflectivity, abrasion resistance, optical clarity, water repellency, resistance to fogging, and anti-reflectivity. Substrates or articles having surfaces upon which the easy-cleaning coating or layer of the present invention can be applied include but are not limited to glass, plastics, metals, painted or colored surfaces, and other materials where cleanability is desirable.

In certain embodiments of the present invention, an easy-cleaning coating or layer comprises silicon dioxide or some other suitable material with the below-described permanent, substantially permanent, or long lasting surface energetics and surface pore sizes.

In one embodiment of the present invention, an easy-clean coating or layer is synthesized in a two-step process. In a first step, an alcohol, one or more silanes, and water is mixed together. After a period of mixing, particles in the range of 3 to 20 nanometers form, in part, due to hydrolysis. In certain embodiments, additional alcohol or combinations of alcohols are added in order to dilute the first mixture as desired. The first mixture is then heated for a period of time to produce a metastable sol, which is comprised of the aforementioned particles having dimensions in the range of approximately 20 to 30 nanometers, water, alcohols, partially hydrolyzed silanes, and oligomeric silane species.

The control of particle size is related directly to the mechanical integrity of the coating. Larger particle sizes effectively reduce the load-bearing portions of the particles and thereby reduce the mechanical integrity of the final coating. Controlling for smaller particle sizes, which is an important aspect of the present invention, results in a smaller effective pore size, described further below.

In certain embodiments, at least one high surface tension reducing surfactant/agent is added to the first mixture. A high surface tension reducing surfactant/agent may, for example, be a silicone-containing surface additive such as a polyether modified polydimethylsiloxane, for example, BYK333 (BYK Additives and Instruments) or other silicone-containing surface additives appropriate for solvent-borne coating systems.

In certain embodiments, the one or more silanes employed are, for example, tetramethyl orthosilicate (TMOS) and/or 3-glycidoxypropyltrimethoxysilane (GPTMS). In certain embodiments, these silanes are combined at s TMOS:GPTMS molar ratio ranging from approximately 1:1 to 19:1 or from approximately 4:1 to 3:2. The molar ratio of TMOS:GPTMS can be directly and selectively manipulated to optimize the durability and surface energy components of the inventive coating.

In the first mixture, water is added at a molar ratio to the total moles of silanes, i.e. water:silanes, in a range of approximately 1:1 to 11:1 or in a range of approximately 2:1 to 4:1. The molar ratios of water:silanes can be directly and selectively manipulated to optimize hydrolysis of the silanes and to prevent the opening of the epoxide group present with the GPTMS. In certain embodiments, hydrolysis is carried out optionally without the presence of an acid or base catalyst. This scheme supports the formation of particles that are imparted with surface hydroxyl and glycidoxypropyl groups. For certain applications, generally hydrophilic particle functionality is desirable.

In the first mixture, alcohol is present at a ratio to the total moles of silanes i.e. alcohol:silanes, in a range of approximately 2:1 to 6:1. Alcohols employed in the first mixture may include, but are not limited to, methanol, ethanol, propanol, or isopropanol. Selection of the alcohol in the first mixture typically depends on the alcohol from which the alkoxy silane is derived.

In certain embodiments of the present invention, in a second step of the two-step synthesis process, a second mixture is formed by combining a portion of the first mixture and additional alcohol or alcohols. The second step or mixture, aids in regulating evaporation and surface tension gradient behavior during subsequent drying of the coating solution. The alcohol employed in the second mixture is optionally the same as the alcohol employed in the first mixture, and is selected from alcohols having the general formula R—OH, where R is a methyl, ethyl, propyl, or isopropyl group, but is preferably a methyl group. The first mixture is diluted to a concentration of about 5 to 80 percent by volume, 10 to 45 percent by volume, or 10 to 30 percent by volume.

In certain embodiments, the second mixture is heated to a temperature in a range of approximately 40 to 80 degrees Celsius or in a range of approximately 50 to 60 degrees Celsius. Heating of the second mixture allows for the condensation of the silanols formed during the hydrolysis that occurs when the first mixture is prepared. Some hydrolysis may continue, but the condensation of the hydrolyzed silanes is the dominant process.

In certain embodiments, the second mixture is heated for a time necessary to obtain the desired extent of reaction as determined by final particle size, for example, the second mixture is heated for a period of approximately 12 to 72 hours. In certain embodiments, the second mixture is heated, for example, at a temperature of approximately 55 degrees Celsius for a period of 72 hours. After heating, the solution comprises particles in a range of approximately 20 to 30 nanometers. The solid content by weight of the solution after heating is in a range of approximately 2 to 5 percent.

In certain embodiments, it may be desirable to stabilize the resulting easy-cleaning coating solution for shelf-life considerations. This is preferably accomplished by the optional addition of a strong acid, such as hydrochloric acid (HCl), at a concentration ranging from about 0.00001 to 0.1 moles HCl per liter of coating solution or a concentration ranging from about 0.001 and 0.05 moles HCl per liter of coating solution. The stabilizing acid is added after the desired particle size distribution is formed.

In certain embodiments, control of the coating thickness and uniformity of the resulting easy-cleaning coating solution is achieved by dilution of the second mixture, by the addition of flow modifiers, or by a combination thereof. For optimal control of thickness and coating uniformity, a preferred concentration of solid content by weight is in a range of approximately 0.5 to 2.0 percent or in a range of approximately 0.65 to 1.5 percent.

In certain embodiments, the flow modifier or modifiers are selected from materials that reduce the surface tension of the coating solution during the drying process, for example a medium to high surface tension reducer. High surface tension reducers are preferred in the present invention and are added at a concentration in a range of approximately 0.03 to 0.13 percent weight to weight of coating solution. The flow modifier employed may, for example, be a silicone-containing surface additive such as a polyether modified polydimethylsiloxane, for example, BYK 333 (BYK Additives and Instruments) or other silicone-containing surface additives appropriate for solvent-borne coating systems. In certain embodiments, it may be desirable to avoid employing flow modifiers that increase the surface slip of the coating.

In certain embodiments of the present invention, the environmental conditions of the synthesis are controlled. For example, synthesis may be conducted at an environmental temperature in a range of approximately 50 to 80 degrees Fahrenheit, in a range of approximately 58 to 78 degrees Fahrenheit, or in a range of approximately 65 to 74 degrees Fahrenheit. The relative humidity at the specified temperatures can be in a range of approximately 8 to 50 percent or in a range of approximately 36 to 43 percent.

The easy-cleaning coating or layer of the present invention is deposited onto a surface of a substrate by methods such as dip-coating, spin-coating, flow-coating, spray-coating, vacuum coating; physical vapor deposition; chemical vapor deposition; and plasma enhanced vapor deposition. The speed at which the substrate is withdrawn from the easy-cleaning coating solution is in a range of approximately 1 to 10 millimeters per second or in a range of approximately 2 to 6 millimeters per second.

After initial application of the easy-cleaning coating, the solvents contained in the coating or layer are evaporated thereby leaving a solid layer of material deposited on the surface of the substrate or article. The easy-cleaning coating or layer is thermally cured to remove any residual solvent that may be present and to initiate a chemical reaction which involves the condensation of metal alkoxides, for example silanols, titanol, or other hydroxyl moieties. Curing is achieved in a range of temperatures, including, ambient temperature for approximately 3 days; in a range of approximately 70 to 130 degrees Celsius for approximately 4 to 8 hours; in a range of approximately 100 to 130 degrees Celsius for approximately 3 to 8 hours; and approximately 200 degrees Celsius for approximately 2-12 minutes. In certain embodiments, the cure temperature may be restricted based on the thermal limits of the substrate or article coated and/or already deposited coating layers on the substrate or article.

In certain embodiments, the resulting easy-clean layer or coating employs a structure of pores. The pores have a diameter, for example, in a range of approximately 2 to 100 nanometers or in a range of approximately 5 to 20 nanometers.

In certain embodiments, the thickness of the resulting easy-clean layer or coating is in a range of approximately 5 to 500 nanometers, in a range of approximately 30 to 150 nanometers, or in a range of approximately 40 to 100 nanometers. In certain embodiments, for example embodiments in which the easy-clean layer is the only functional layer or coating on a substrate or article, the thickness of the easy-clean layer or coating is in a range of approximately 1 to 30 nanometers.

The resulting easy-clean layer or coating is optically clear and has a percent total light transmission in a range of approximately 85 to 99 percent on a variety of transparent substrates.

In certain embodiments of the present invention, the cured easy-cleaning coating has a surface energy in a range of approximately 30 to 90 millijoules per square meter. In order to control and manipulate the cleanability of the inventive easy-cleaning coating or layer, the dispersive and polar components of the surface energy are carefully controlled. In certain embodiments of the present invention, the polar component of the coating material's surface energy is in a range of approximately 14 to 40 millijoules per square meter, in a range of approximately 22 to 37 millijoules per square meter, or in a range of approximately 28 to 37 millijoules per square meter.

In certain embodiments of the present invention, the dispersive component of the coating surface energy of the easy-cleaning coating or layer is in a range of approximately 20 to 40 millijoules per square meter or in a range of approximately 27 to 40 millijoules per square meter. These ranges of dispersive and polar components of the surface energy of the easy-cleaning coating or layer of the present invention are maintained after cleaning of the coating surface with typical cleaning solutions. In various embodiments, the values are maintained within at least 10 percent.

FIG. 1 shows a substrate 12 that has a surface 8 that is coated with an easy-cleaning coating or layer 14 according to one embodiment of the present invention. In this embodiment, the easy-cleaning coating 14 is the only coating applied to the surface 8 of the substrate 12.

Figure 2:
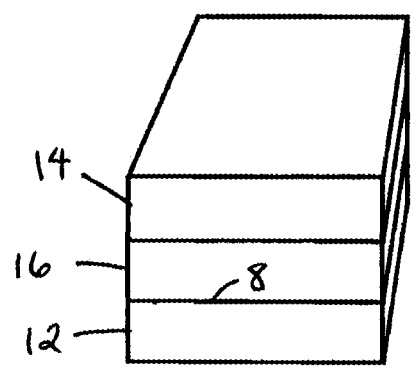
FIG. 2 is a perspective view of a coated substrate according to one embodiment of the present invention.

In certain embodiments of the present invention, as shown in FIG. 2, it may be desirable to employ an adhesive 16 on the surface 8, between the substrate 12 and the easy-cleaning coating 14.

Figure 3:
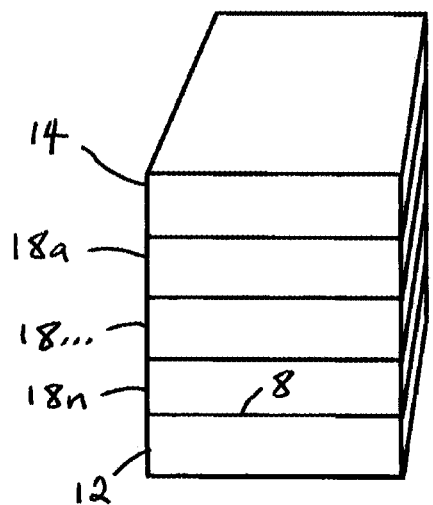
FIG. 3 is a perspective view of a coated substrate according to one embodiment of the present invention.

As shown in FIG. 3, in certain embodiments of the present invention, the easy-cleaning coating 14 is applied on top of one or more other functional coatings or layers 18a through 18n. The functional coatings 18a through 18n may, for example, impart functional properties or characteristics on to the substrate 12 such as, but not limited to, color, gloss, anti-static performance, abrasion or corrosion resistance, photochromism, or polarization. The designators 18a through 18n are intended to mean that the number of functional coatings applied between substrate 12 and easy-cleaning coating 14 is not limited. For the sake of clarity, it is contemplated that one or more layers of adhesive 16 may be employed in, among, on, and/or under any of the functional coatings 18a through 18n.

In certain embodiments of the present invention, the present invention provides a surface of an article with a durable, easy-cleaning property in combination with the property of anti-fogging or fogging resistance. In certain embodiments, a wet anti-fogging chemical treatment is applied to the easy-cleaning coating or layer such that the active anti-fogging ingredient is able to penetrate into and/or leave a residue on the easy-cleaning coating or layer resulting a surface having both anti-fogging behavior and cleanability. The wetting properties of easy-cleaning coating facilitate this treatment process by promoting the covering of the easy-cleaning surface with the anti-fogging solution.

The easy-cleaning coating or layer of the present invention is treated with an anti-fogging performance enhancer such as nonionic fluorosurfactants, for example, short-chain perfluoro-based ethoxylated nonionic fluorosurfactant, for example, S559 (Chemguard). Selection of the anti-fogging performance enhancer is made such that the polar component of the surface energy of the easy-cleaning coating is increased after treatment with the anti-fogging performance enhancer from approximately 14 millijoules per square meter to about 27 millijoules per square meter or to approximately 40 millijoules per square meter.

The anti-fogging performance enhancer employed in certain embodiments of the present invention is applied, for example, by using a mixture of ethers, alcohols, or combinations of the like at a concentration by volume in a range of approximately 0.5 to 30 percent or in a range of approximately 2 to 10 percent. The easy-cleaning coated article can be soaked in the anti-fogging performance enhancer solution or the anti-fogging performance enhancer can be sprayed on the easy-cleaning coated article. After drying of the anti-fogging solution onto the easy-cleaning coating, the surface can be buffed until clear or rinsed with solvents such as alcohols, ethers, or combinations of the like. The penetration of the anti-fogging solution into the pores of the easy-cleaning coating matrix allows for preservation of the anti-fogging behavior after many cleaning cycles.

In the present embodiment, treatment of the easy-cleaning coating or layer with the anti-fogging solution does not affect the value of the dispersive component of the surface energy of the coated article. Thus, the dispersive component of the surface energy should remain in a range of approximately 20 to 40 millijoules per square meter or in a range of approximately 27 to 40 millijoules per square meter after the coating is subject to surface anti-fogging treatment.

Figure 4:
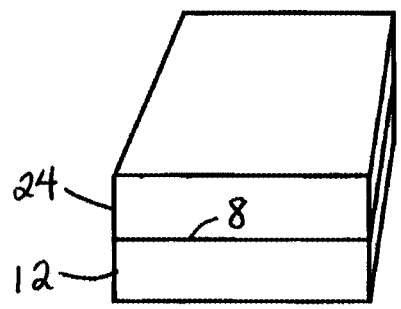
FIG. 4 is a perspective view of a coated substrate according to one embodiment of the present invention.

FIG. 4 shows the substrate 12 having an anti-fogging treated easy-cleaning coating 24 according to one embodiment of the present invention. In this embodiment, the anti-fogging treated easy-cleaning coating 24 is the only coating applied to the surface 8 of the substrate 12.

Figure 5:
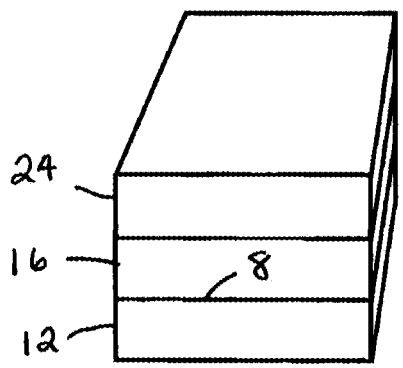
FIG. 5 is a perspective view of a coated substrate according to one embodiment of the present invention.

In certain embodiments of the present invention, as shown in FIG. 5, it may be desirable to employ the adhesive 16 on the surface 8, between the substrate 12 and the anti-fogging treated easy-cleaning coating 24.

Figure 6:
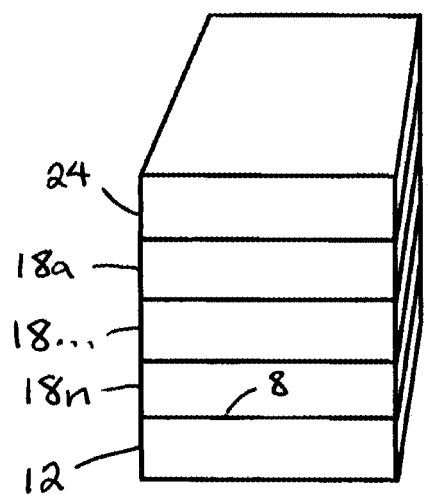
FIG. 6 is a perspective view of a coated substrate according to one embodiment of the present invention.

As shown in FIG. 6, in certain embodiments of the present invention, the anti-fogging treated easy-cleaning coating 24 is applied on top of one or more other functional coatings or layers 18a through 18n. The functional coatings 18a through 18n may, for example impart functional properties or characteristics on to the substrate 12 such as, but not limited to, color, gloss, anti-static performance, abrasion or corrosion resistance, photochromic, or polarization. The designators 18a through 18n are intended to mean that the number of functional coatings applied between substrate 12 and the anti-fogging treated easy-cleaning coating 24 is not limited. For the sake of clarity, it is contemplated that one or more layers of the adhesive 16 may be employed in, among, on, and/or under any of the functional coatings 18a through 18n.

Figure 7:
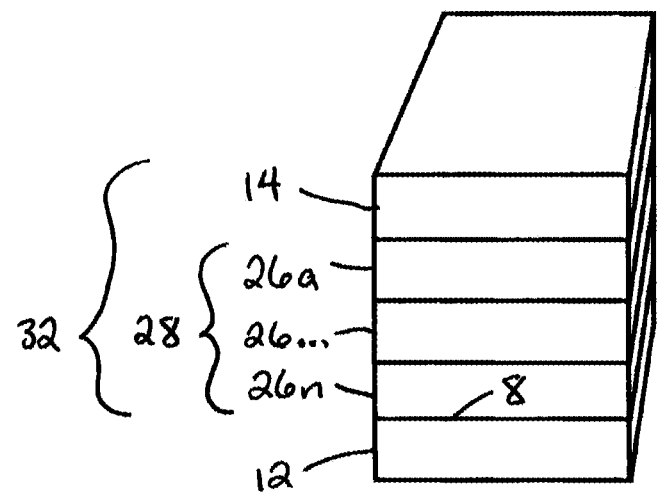
FIG. 7 is a perspective view of a coated substrate according to one embodiment of the present invention.

In certain embodiments of the present invention, the present invention provides a surface of an article with a durable anti-reflective coating with easy-cleaning properties. With reference to FIG. 7, according to the present embodiment, a pre-tuned anti-reflective stack or coating system 28 is applied to a surface of the substrate 12. The pre-tuned anti-reflective stack 28 may employ, for example, a system of alternating high and low index refractive layers 26a through 26n.

For example, the refractive layers 26a through 26n may comprise alternating layers of silicon dioxide and either titanium dioxide or titanium pentoxide; alternating layers of silicon dioxide and zirconium dioxide; or alternating layers of silicon, silicon dioxide, and titanium dioxide. The designators 26a through 26n are intended to mean that the number of refractive layers applied is not limited.

The pre-tuned anti-reflective stack 28 will not have anti-reflective properties until the easy-cleaning layer or coating 14 is applied as a final layer over the pre-tuned anti-reflective stack 28. Once the easy-cleaning layer or coating 14 is applied to the pre-tuned anti-reflective stack 28, a tuned anti-reflective stack 32 is formed.

In certain embodiments of the present invention, a refractive index of the resulting easy-clean layer or coating, i.e. the refractive index of an optical article having a tuned anti-reflective stack as defined above, is in a range of approximately 1.40 to 1.49 measured at 589 nanometers.

In the present embodiment, an adhesive or adhesives may be employed in, among, on, and/or under any of the other functional coatings or layer present on the substrate.

Figure 8:
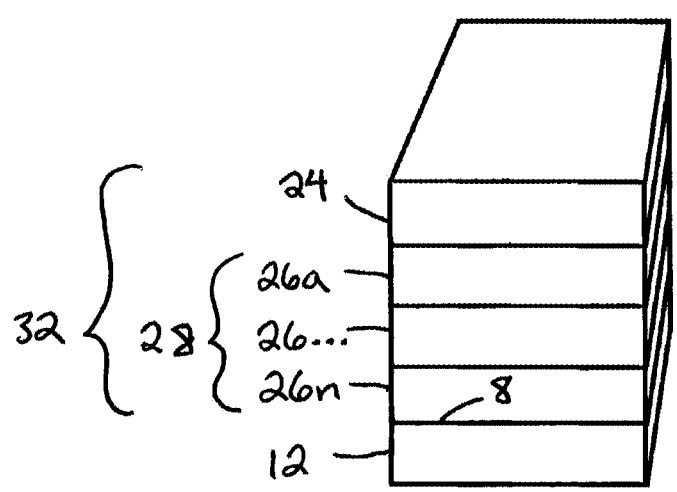
FIG. 8 is a perspective view of a coated substrate according to one embodiment of the present invention.

In certain embodiments of the present invention, the present invention provides a surface of an article with a durable anti-reflective coating with easy-cleaning properties and the property of anti-fogging or fogging resistance. With reference to FIG. 8, according to the present embodiment, the easy-cleaning layer 14 shown in FIG. 7 is treated with the above-described anti-fogging performance enhancer thereby forming the anti-fogging treated easy-cleaning coating 24. Thus resulting in an anti-fogging, easy-cleaning, tuned anti-reflective stack 32.

Examples: Synthesis of Easy-Cleaning, Anti-Fogging, Anti-Reflective Ophthalmic Lens A precursor solution (first mixture) was prepared by adding 156.4 milliliters of TMOS, 100.4 milliliters of bifunctional organosilane possessing a reactive organic epoxide and hydrolyzable inorganic methoxysilyl groups, for example 3-glycidoxylpropyl trimethoxysilane (Dynasylan Glymo. Evonik Industries), and 310.8 milliliters water in 232.8 milliliters methanol. The mixture was agitated and allowed to hydrolyze for a period of 4 hours, during which time the solution noticeably heated. After 4 hours, once cooling had begun, the precursor solution was diluted with 3.2 liters methanol, and placed in an oven at 50 degrees Celsius on a stir plate with a stir bar for mixing. The solution was heated in the oven for 4 days. The solution was then removed from the oven and the hydrophilic property was tested to assess the solution process. Once verified, 200 milliliters 1.0N HCl (made from 37 percent stock) was added to stabilize the resulting sol by preventing further aging and reaction. This yielded a total of 4.2 liters of a solution of 3.47 percent solids.

Once solids were measured, the solution was diluted to a solids content by weight of 0.86 percent. This was accomplished by removing 2117.6 milliliters of the base solution to a 2.5 gallon container, whereupon 1414.7 milliliters of methanol, 3010.0 milliliters ethanol, 890 milliliters 1-methoxy-2-propanol (PGME), and 1565.3 milliliters water were added, along with 6.095 grams BYK333. The final percent by weight solution of the components of the resulting composition are provided in FIG. 9.

The viscosity of the resulting composition was between 1.2 and 1.5 centipoise, and the density was around 0.86 grams per milliliter. The resulting composition, when placed in a Weir coating vessel, created a layer approximately 50 nanometers thick, plus or minus 5 percent when dipped with an extraction speed of 2.5 millimeters per second at relative humidity between 35 and 45 percent on the specially designed pre-tuned anti-reflective stack, thereby completing the stack to result in an anti-reflective coating. The resulting coating was cured for 3 hours at a temperature of 120 degrees Celsius.

Figures 9, 10:
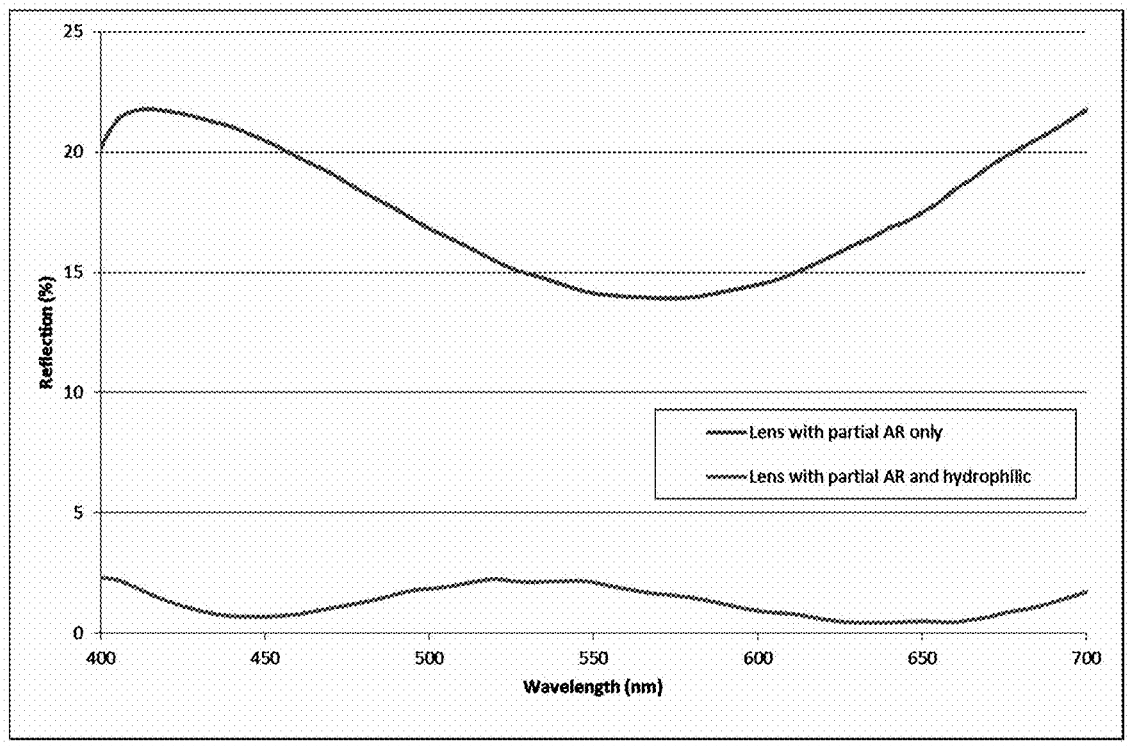
FIG. 9 is a table showing the percent by weight solution of components of a coating solution according to one embodiment of the present invention.
FIG. 10 is a graph of reflectance data of an optical article with and without a coating according to one embodiment of the present invention.
Figures 11, 12, 13:
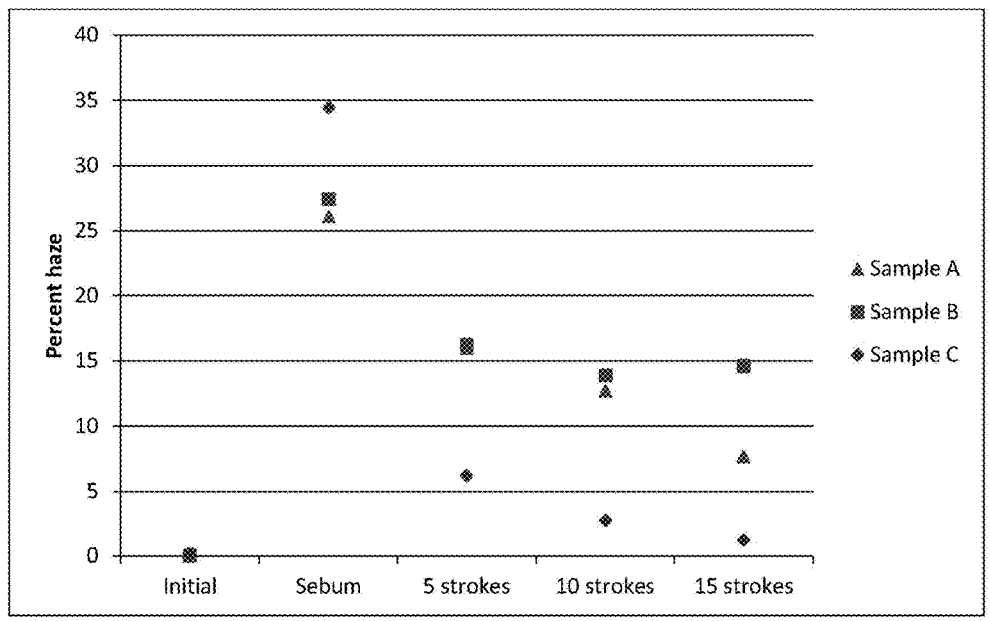
FIG. 11 is a table showing color data for a coated lens according to one embodiment of the present invention.
FIG. 12 is a table showing a comparison of conventional coated lenses and a coated lens according to one embodiment of the present invention.
FIG. 13 is a graph showing a comparison of conventional coated lenses and a coated lens according to one embodiment of the present invention.

FIG. 10 shows percent reflection data for a lens having a pre-tuned anti-reflective stack (darker line) and the same lens after the pre-tuned anti-reflective stack was coated with the easy-cleaning coating of the present invention (lighter line), i.e. after formation of a tuned anti-reflective stack. FIG. 11 shows lens color data for a lens having a pre-tuned anti-reflective stack and the same lens after the pre-tuned anti-reflective stack was coated with the easy-cleaning coating of the present invention, i.e. after formation of a tuned anti-reflective stack.

FIGS. 10 and 11 show the optical qualities of the lens with the pre-tuned anti-reflective stack, before and after the application of the cleanable coating. The pre-tuned anti-reflective stack on its own had a red-gold, highly reflective coating. The addition of the cleanable layer at a thickness of 50 nanometers+/−5 nanometers shifted the color of pre-tuned anti-reflective stack to a desirable, anti-reflective green, as the cleanable coating completes the anti-reflective stack.

The cleanable coating was treated with an anti-fog additive by dipping the coated lens in a 2% solution of S559 (Chemguard) in ethanol, and then buffing the surface with a TX1009 microfiber cloth after it had air-dried to remove residual S559.

Anti-Fogging Performance: The anti-fogging performance of the above-described anti-reflective, easy-cleaning, anti-fogging coated lens was analyzed by placing the lens over a beaker of water heated to 60 degrees Celsius for several minutes. No fogging was observed on the surface of the coated lens.

Cleanability Performance: The easy-cleaning performance of the above-described anti-reflective, easy-cleaning, anti-fogging coated lens was analyzed and compared to other products marketed as easy to clean. The analysis employed applying an artificial skin oil, also known as synthetic sebum (Scientific Services S/D Inc.) to the coated surface of the lens of the present invention, sample "C" and to two different ophthalmic lenses marketed as having anti-reflective and easy-cleaning properties, samples "A" and "B."

Lens haze was measured with a BYK-Gardner Haze-gard plus, Cat. No. 4725 before application of sebum, "Initial"; after application of sebum, "Sebum"; after 5 strokes of wiping, "5 Strokes"; after 10 strokes of wiping, "10 Strokes"; after 15 strokes of wiping, "15 Strokes." After the "Sebum" reading, each test surface was subjected to wiping with a specified material (a polyester cloth for example TX1009) for a given number of wipes (measurement of haze done per number of cycles) under a weight (0.5 pounds for the testing herein described) with a contact area of approximately 1.7 to 1.8 square inches. Cleaning cloth material is replaced after 5 to 6 wipes. The haze values are reported for the number of wiping strokes or cycles. A higher haze value indicates more loss of optical clarity.

Test results are shown quantitatively in FIG. 12 and graphically in FIG. 13. As observed from this data, the anti-reflective, easy-cleaning, anti-fogging coated lens of the present invention, Sample C, showed less haze than the market Samples A and B after each of 5, 10, and 15 strokes of wiping. Hence, the lens according to the present invention shows greater cleanability than the currently marketed "easy-cleaning" lenses tested.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. An optical coating composition that imparts an easy-cleaning, an anti-fogging and an anti-reflecting properties on a surface of an article comprising:
   at least one silane of a formula (1);

$$R^1Si(OR^2)_3 \qquad (1)$$

wherein $R^1$ comprises a reactive organic epoxide group and $R^2$ is a methyl group, an ethyl group, a propyl group or an isopropyl group;
   an alcohol component, water, and
   further comprising a silane compound having a formula (2), $$Si(OR^2)_4 \qquad (2)$$

wherein $R^2$ is a methyl group, an ethyl group, a propyl group or an isopropyl group;
   wherein said coating composition further comprises at least one high surface tension reducing surfactant.

2. The optical coating composition of claim 1, wherein a molar ratio of said silane of formula (2) and said silane of formula (1) ranges from approximately 1:1 to 19:1.

3. The optical coating composition of claim 1, wherein a molar ratio of said silane of a formula (2) and said silane of formula (1) ranges from approximately 4:1 to 3:2.

4. The optical coating composition of claim 1, wherein said reactive organic epoxide group comprises a 3-glycidoxylpropyl group.

5. The optical coating composition of claim 1, wherein water is added at a molar ratio to a total mole of said silane of formula (1) and said silane of formula (2).

6. The optical coating composition of claim 5, wherein said molar ratio of water and said total moles of said silane of formula (1) and said silane of formula (2) is in a range of about 1:1 to 11:1.

7. The optical coating composition of claim 5, wherein said molar ratio of water and said total moles of said silane of formula (1) and said silane of formula (2) is in a range of about 2:1 to 4:1.

8. The optical coating composition of claim 5, wherein said molar ratio of water and said silane of formula (1) and said silane of formula (2) are adjusted to optimize a hydrolysis of said silane of formula (1) and said silane of formula (2) and to prevent a ring opening of said epoxide group of said silane of formula (1).

9. The optical coating composition of claim 1, wherein said alcohol component is added at a molar ratio to a total mole of said silane of formula (1) and said silane of formula (2).

10. The optical coating composition of claim 9, wherein said molar ratio of said alcohol component and said total moles of said silane of formula (1) and said silane of formula (2) is in a range of about 2:1 to 6:1.

11. The optical coating composition of claim 1, wherein said alcohol component is selected based on $R^2$ of said silane of formula (1) and said silane of formula (2).

12. The optical coating composition of claim 1, wherein said alcohol component comprises methanol, ethanol, propanol, or isopropanol.

13. The optical coating composition of claim 1, wherein said surfactant is a silicone-containing surface additive.

14. The optical coating composition of claim 1, wherein said silicone-containing surface additive comprises a polyether modified polydimethylsiloxane.

15. The optical coating composition of claim 1, wherein said composition further comprises an acid.

16. The optical coating composition of claim 15, wherein said acid is hydrochloric acid at a concentration ranging from about 0.00001 to 0.1 moles per liter of coating solution.

17. The optical coating composition of claim 15, wherein said acid is hydrochloric acid at a concentration ranging from about 0.001 and 0.05 moles per liter of coating solution.

18. The optical coating composition of claim 1, wherein said composition comprises pores having diameters in a range of approximately 5 to 20 nanometers.

19. A method of preparing an optical coating composition that imparts an easy-cleaning, an anti-fogging and an anti-reflecting properties on a surface of an article comprising:
   a) forming a first mixture in a first step by combining:
      i) at least one silane of a formula (1);

$$R^1Si(OR^2)_3 \qquad (1)$$

wherein $R^1$ comprises a reactive organic epoxide group and $R^2$ is a methyl group, an ethyl group, a propyl group or an isopropyl group;
      ii) an alcohol component,
      iii) water, and
      iv) a silane compound having a formula (2), $$Si(OR^2)_4 \qquad (2)$$

wherein $R^2$ is a methyl group, an ethyl group, a propyl group or an isopropyl group;
      wherein said coating composition further comprises at least on high surface tension reducing surfactant
   b) heating said first mixture for a period of time to promote hydrolysis;
   c) forming a second mixture in a second step by diluting a portion of said first mixture and adding at least one additional alcohol component from said first mixture;
   d) heating said second mixture formed at said second step at a range of temperature and for a period of time; and
   e) stabilizing said second mixture by adding an acid.

20. The method of claim 19, wherein step b) includes heating said first mixture for 4 hours to promote hydrolysis.

21. The method of claim 19, wherein step c) includes diluting said first mixture to a concentration of about 5 to 80 percent by volume.

22. The method of claim 19, wherein step c) includes diluting said first mixture to a concentration of about 10 to 45 percent by volume.

23. The method of claim 19, wherein step c) includes diluting said first mixture to a concentration of about 10 to 30 percent by volume.

24. The method of claim 19, wherein step d) includes heating said second mixture in a range of approximately 40 to 80 degrees Celsius for 12 to 72 hours.

25. The method of claim 19, wherein step d) includes heating said second mixture in a range of approximately 50 to 60 degrees Celsius for 12 to 72 hours.

26. The method of claim 19, wherein step e) includes stabilizing said second mixture by adding said acid comprising hydrochloric acid at a concentration ranging from about 0.00001 to 0.1 moles per liter of said second mixture.

27. The method of claim 19, wherein step e) includes stabilizing said second mixture by adding said acid comprising hydrochloric acid at a concentration ranging from about 0.001 and 0.05 moles per liter of said second mixture.

28. The method of claim 19, wherein step a) includes combining a molar ratio of said silane of formula (2) and said silane of formula (1) ranging from approximately 1:1 to 19:1.

29. The method of claim 19, wherein step a) includes combining a molar ratio of said silane of a formula (2) and said silane of formula (1) ranging from approximately 4:1 to 3:2.

30. The method of claim 19, wherein step a) includes adding water to a total mole of said silane of formula (1) and said silane of formula (2) to obtain a molar ratio of water:silanes of about 1:1 to 11:1.

31. The method of claim 19, wherein step a) includes adding water to a total mole of said silane of formula (1) and said silane of formula (2) to obtain a molar ratio of water:silanes of about 2:1 to 4:1.

32. The method of claim 19, wherein step a) includes adding said alcohol component to a total mole of said silane of formula (1) and said silane of formula (2) to obtain a molar ratio of said alcohol component:silanes of about 2:1 to 6:1.

\* \* \* \* \*